(12) United States Patent
Iwamura et al.

(10) Patent No.: US 7,120,446 B2
(45) Date of Patent: Oct. 10, 2006

(54) CALL ADMISSION CONTROL METHOD, COMMUNICATION SYSTEM AND BASE STATION DEVICE

(75) Inventors: Mikio Iwamura, Zushi (JP); Yoshihiro Ishikawa, Yokosuka (JP); Seizo Onoe, Yokohama (JP); Takehiro Nakamura, Yokosuka (JP); Takahiro Hayashi, Yokosuka (JP); Yoshiaki Ofuji, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 567 days.

(21) Appl. No.: 10/054,992

(22) Filed: Jan. 25, 2002

(65) Prior Publication Data

US 2002/0102986 A1 Aug. 1, 2002

(30) Foreign Application Priority Data

Jan. 26, 2001 (JP) ............................ P2001-019071

(51) Int. Cl.
*H04Q 7/20* (2006.01)
(52) U.S. Cl. .................... 455/453; 455/512; 455/435.3
(58) Field of Classification Search ................ 455/453, 455/512, 452.1, 424, 450, 509, 435.3, 452.2, 455/435.1, 435.2
See application file for complete search history.

(56) References Cited

U.S. PATENT DOCUMENTS

| 5,570,411 | A | * | 10/1996 | Sicher ........................ 455/450 |
| 5,627,876 | A | * | 5/1997 | Moon ....................... 455/426.1 |
| 5,740,537 | A | * | 4/1998 | Beming et al. ............. 455/450 |
| 5,991,618 | A |   | 11/1999 | Hall |
| 6,532,227 | B1 | * | 3/2003 | Leppisaari et al. ......... 455/450 |
| 6,760,594 | B1 | * | 7/2004 | Murasawa et al. .......... 455/512 |

FOREIGN PATENT DOCUMENTS

| EP | 0 522 276 | 1/1993 |
| EP | 0 545 533 | 6/1993 |
| JP | 10-013937 | 1/1998 |

OTHER PUBLICATIONS

A. G. Qureshi, et al., International Conference on Information, Communication and Signal Processing, vol. 1A1.5, XP-002084744, pp. 1-5, "Dynamic Resource Allocation for GSM-GPRS Services Over a Leo Satellite System", Sep. 9-12, 1997.

* cited by examiner

*Primary Examiner*—Joseph Feild
*Assistant Examiner*—Huy Nguyen
(74) *Attorney, Agent, or Firm*—Oblon, Spivak, McClelland, Maier & Neustadt, P.C.

(57) ABSTRACT

In resource measurement device 32, a measured value x of resource use condition is acquired in respect of the wireless resource to be monitored. Furthermore, in comparators 34 and 35, the measured value x is compared with the call admission threshold value $x_A$ of service A or with the call admission threshold value $x_B$ of service B, respectively. Comparison result selector 36 then selects one or other of the comparison results of comparators 34 and 35 in accordance with the type or degree of priority of the service of the call requested, identified by service identifier 33, and call admission control device 31 restricts new call admission in accordance with the selected comparison result. Thus, the call admission control method, communication system and base station device wherein deterioration of communication quality is suitably suppressed by call admission control in accordance with the service that is being utilized are provided in communication in which access is performed with shared resources.

16 Claims, 7 Drawing Sheets

CALL ADMISSION CONTROL METHOD, COMMUNICATION SYSTEM AND BASE STATION DEVICE

BACKGROUND OF THE INVENTION

1. Field of the Invention

The present invention relates to a call admission control method, communication system and base station device employed in communications in which access is performed by a plurality of users with shared resources.

2. Related Background Art

In a mobile communication system comprising a wireless base station and a plurality of mobile stations, data communication (transmission/reception) is performed by wireless communication circuits between the base station and the mobile stations. Circuit switching systems and packet switching systems are examples of switching systems employed in such data transmission/reception.

As the access system, the code division multiple access system (CDMA), the frequency division multiple access system (FDMA) or the time division multiple access system (TDMA) may be employed.

SUMMARY OF THE INVENTION

In a mobile communication system as described above, irrespective of the switching system or access system that is employed, transmission/reception of data by multiple access is performed by a plurality of users sharing the same wireless resource.

For example, in the case of the CDMA system, a plurality of user communication channels are multiplexed on the same wireless frequency band and wireless resources such as the amount of up-link interference, the down-link transmission power, and spreading codes are shared by a plurality of users.

Spreading codes are allocated to each user in multiple access using a CDMA system and are employed to distinguish the communication channels of each user. Since, by employing mutually orthogonal spreading codes under synchronization as these spreading codes, effects between communication channels can be eliminated, a group of orthogonal spreading codes is employed on the down-link circuit (transmission from the base station to the mobile stations) where synchronization is easy to achieve. However, since there is an upper limit on the number of mutually orthogonal spreading codes, this limited number of spreading codes is shared by a plurality or users.

Also, in the case of up-link circuits (communication from the mobile stations to the base station), the communication channels from different users act as mutually interfering channels. In order to cope with such communication channel interference, it is possible to increase the transmission power of the communication channels from the mobile stations in order to ensure the necessary communication quality, even when the amount of up-link interference increases due to the number of users simultaneously performing data transmission/reception becoming large. However, there is an upper limit on the transmission power, so lowering of communication quality occurs when the amount of up-link interference exceeds a limiting value. That is, on the up-link circuits of a CDMA system, a limited amount of up-link interference is shared by a plurality of users Also, on the down-link circuits of the CDMA system, limited transmission power from the base stations is shared by a plurality of users.

Also, even if the FDMA system or TDMA system is employed, the same wireless resource is shared by a plurality of users in the same way as in the case of a CDMA system. In the case of an FDMA system, wireless resources such as base station modem devices, transmission power and carriers etc are shared. Also, in the case of a TDMA system, wireless resources such as base station modem devices, transmission power and time slots are shared.

If, with regard to limited wireless resources as aforementioned that are shared by a plurality of users, all of the call requests created by circuit switching calls or packet calls etc originated from the users are accepted, there is a problem that the shared wireless resources are insufficient, producing deterioration of communication quality for all users.

In order to avoid such deterioration of communication quality, in a mobile communication system, call admission control is performed whereby call admission at each timepoint is controlled in accordance with the condition of use of the wireless resources. One method of controlling call admission is for example to set up a call admission threshold value defining an upper limit in respect of the condition of use of the wireless resources and to restrict new call admission in periods where the measured value of the resource use condition exceeds this call admission threshold value.

In recent years, with the development of multimedia communication of various types, due to the increasing demand to make communication systems economic, the necessity of providing services of many different types using the same communication system has increased. For example, in fixed telephone networks, portable telephone networks and Internet networks etc, a plurality of services are already present together in a single system and diversification of the services that are provided is increasing.

Of the services that are employed in communication systems, for some services, such as ordinary telephone calls, real-time characteristics are demanded. There are also services in which a certain degree of data transmission delay is permissible, such as downloading of data through the Internet. Also, even in regard to telephone calls, there are differences in importance or urgency such as for example ordinary telephone calls between individuals and emergency telephone calls.

In communication systems in which such services of different types are present together, protection of the various services by call admission control cannot be satisfactorily achieved simply by performing control by setting a call admission threshold value. Specifically, if control is performed simply by setting a call admission threshold value, problems arise such as that call admissions are restricted in respect of calls by services having a high degree of priority or that the communication quality of calls of services of high priority is adversely affected by the pressure of calls of services of low degree of priority and in some cases such services of high priority may be forcibly disconnected. Such problems of call admission control are not restricted to mobile communication systems but occur generally in communication systems in which resources are shared.

The present invention was made in order to solve the above problems, its object being to provide a method of call admission control, communication system and base station device whereby, in communication in which access is performed with shared resources, deterioration of communication quality is suitably suppressed by call admission control in accordance with the service that is utilized.

In order to achieve this object, in communication in which calls of a plurality of services having mutually different degrees of priority are present and respective calls perform access with shared resources, a call admission control method according to the present invention of controlling call admission is characterized in that for the plurality of services, a plurality of corresponding call admission threshold values are set beforehand in accordance with the respective degrees of priority; and in respect of a requested call, the resource use condition of a predetermined resource designated as the subject of monitoring and the call admission threshold value corresponding to the service in this call are compared and new call admission in respect of the requested call is restricted in accordance with the comparison result.

Also, a communication system according to the present invention in which a call admission control method of controlling call admission is employed, wherein in communication in which calls of a plurality of services having mutually different degrees of priority are present and respective calls perform access with shared resources, is characterized in that for the plurality of services, a plurality of corresponding call admission threshold values are set beforehand in accordance with the respective degrees of priority; and in respect of a requested call, the resource use condition of a predetermined resource designated as the subject of monitoring and the call admission threshold value corresponding to the service in this call are compared and new call admission in respect of the requested call is restricted in accordance with the comparison result.

Also, a base station device according to the present invention in which a call admission control method of controlling call admission is employed, wherein in communication in which calls of a plurality of services having mutually different degrees of priority are present and respective calls perform access with shared resources, is characterized in that, for the plurality of services, a plurality of corresponding call admission threshold values are set beforehand in accordance with the respective degrees of priority; and in respect of a requested call, the resource use condition of a predetermined resource designated as the subject of monitoring and the call admission threshold value corresponding to the service in this call are compared and new call admission in respect of the requested call is restricted in accordance with the comparison result.

In the above method of call admission control, communication system and base station device, in communication such as mobile communication in which calls of a plurality of services having mutually different degrees of priority are present, acceptance of new calls is restricted by applying a call admission threshold value in respect of resource use condition and, as this call admission threshold value that is employed for restriction purposes, call admission threshold values are employed which are respectively set in accordance with the degree of priority of the service.

Thus, the method of restricting acceptance of new calls can be altered in accordance with the difference of degree of priority of the respective services. In this way, in communication in which access is performed with shared resources, deterioration of communication quality can be suppressed and control of call admission can be performed in a suitable manner in accordance with the service that is being utilized. Specifically, the degree of priority of the respective services corresponds to the real-time character, importance and urgency of the communication referred to above.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

A preferred embodiment of a call admission control method, communication system and base station device according to the present invention is described in detail below with reference to the drawings. Identical elements in the description of the drawings are given the same reference symbols and the description thereof is not repeated. The dimensional ratios in the drawings do not necessarily coincide with the description.

Figure 1:
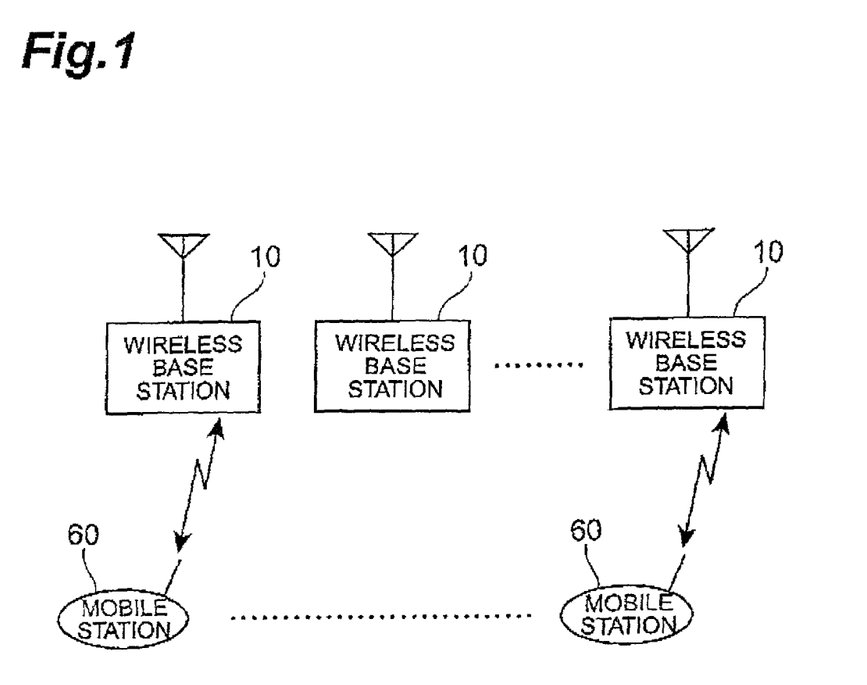
FIG. 1 is a schematic diagram illustrating the configuration of an embodiment of a mobile communication system.

FIG. 1 is a schematic diagram illustrating the configuration of an embodiment of a mobile communication system constituting a communication system according to the present invention. The mobile communication system shown in FIG. 1 comprises a plurality of wireless base stations 10 and a plurality of mobile stations 60 that perform data communication (transmission/reception), being connected by wireless communication circuits with base stations 10. In a mobile communication system constructed in this way, the communication circuits that perform transmission From mobile stations 60 to base stations 10 are up-link circuits and the communication circuits that perform transmission from base stations 10 to mobile stations 60 are down-link circuits.

This mobile communication system is constructed as a mobile communication system in which multiple access is performed by respective calls, using shared wireless resources. That is, the same wireless resource is shared by communication of the users corresponding to a plurality of mobile stations 60. A specific description of the shared wireless resources will be given later.

Also, in the present mobile communication system, a plurality of services of different degrees of priority are provided using the same communication system. That is, calls of a plurality of services having mutually different degrees or priority are present at the same time. Also, as the switching system for performing transmission/reception of data between base stations 10 and mobile stations 60, either or both of a packet switching system and circuit switching system is employed. Also, as the access system a predetermined communication system such as for example the CDMA system, FDMA system or TDMA system is employed.

Figure 2:
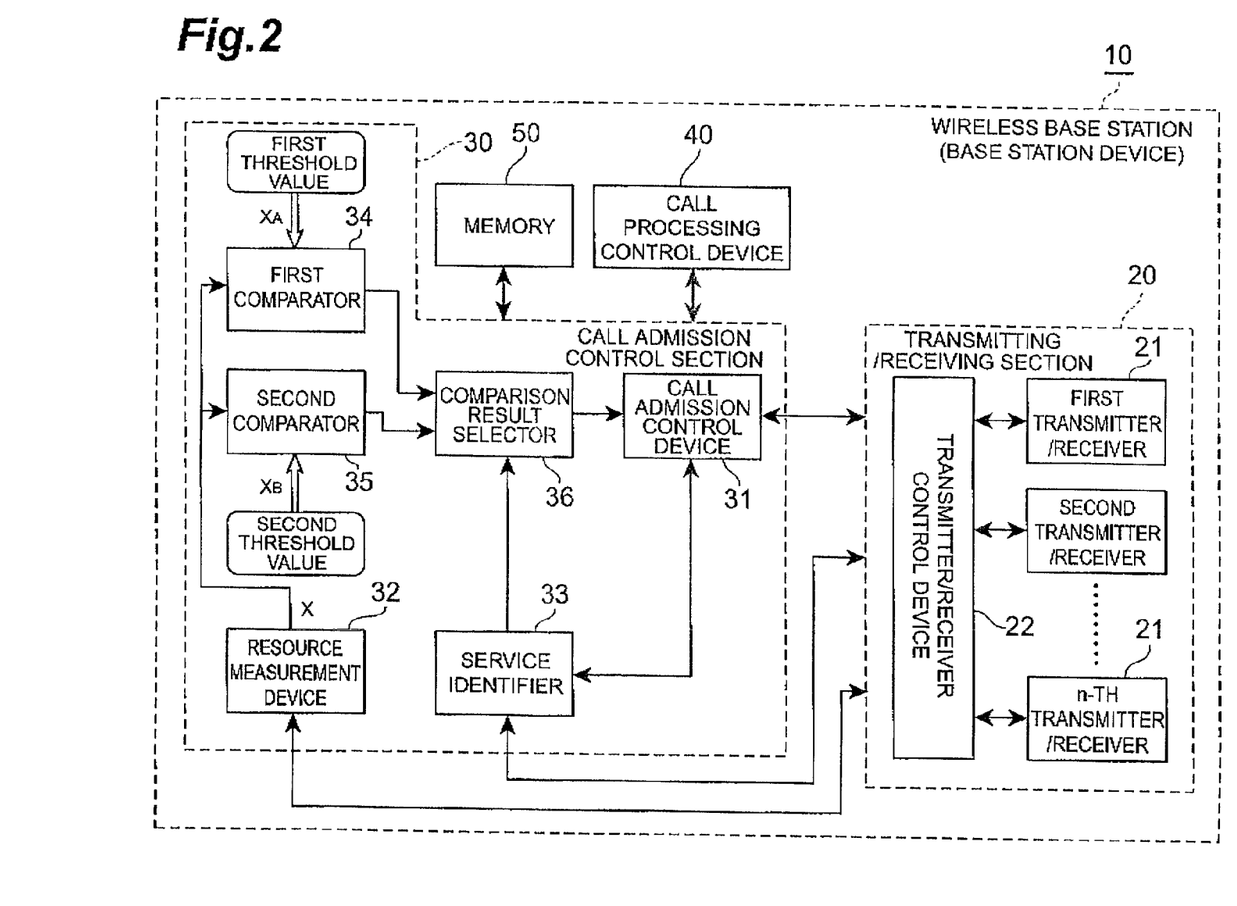
FIG. 2 is a block diagram illustrating the structure of an embodiment of a base station device.

FIG. 2 is a block diagram illustrating the structure of an embodiment of a base station device according to the present invention that is employed as a wireless base station in the mobile communication system illustrated in FIG. 1. Also, in this embodiment, it will be assumed that, as the plurality of services having mutually different degrees of priority, two types of service, namely, a service A constituting a first service of high degree of priority and a service B constituting a second service of lower degree of priority than service A are provided.

This base station device 10 comprises a transmitting/receiving section (transmitter/receiver) 20 and call admission control section 30. Also, a call processing control device 40 and memory 50 are connected to call admission control section 30.

Transmitting/receiving section 20 is connected with call admission control section 30 and a transmission path (not shown) to the outside; it performs transmission reception of data in accordance with instructions etc from call admission control section 30. In FIG. 2, as an example of the structure of transmitting/receiving section 20, a transmitting/receiving section 20 is illustrated of a construction having n first to n-th transmitters/receivers 21 and transmitter/receiver control device 22 that respectively controls these connected to these transmitters/receivers 21.

Call admission control section 30 comprises a call admission control device 31, resource measurement device (resource measurement means) 32, service identifier (service identification means) 33, first comparator (comparison means) 34, second comparator (comparison means) 35 and comparison result selector (comparison result selection means) 36. Call admission control device 31 is connected with transmitting/receiving section 20 and comparison result selector 36; it controls call admission operation and data transmitting/receiving operation by transmitting/receiving section 20 in accordance with requests from call processing control device 40, and also performs reading, updating and writing etc of the necessary data with respect to memory 50.

Resource measurement device 32 is connected with transmitting/receiving section 20, first comparator 34 and a second comparator 35; it measures the resource use condition of the wireless resource at transmitting/receiving section 20 that is to be the subject of monitoring and outputs this measured value to first comparator 34 and second comparator 35. Service identifier 33 is connected with transmitting/receiving section 20, call admission control device 31 and comparison result selector 36; it outputs service information to comparison result selector 36 by identifying the type of service requested by a call or the degree of priority of this service, using information from transmitting/receiving section 20 or call admission control device 31.

First comparator 34 is a comparator provided corresponding to service A. This first comparator 34 is connected with resource measurement device 32 and comparison result selector 36; it compares the measured value of the resource use condition and the call admission threshold value for service A (first threshold value) and outputs this comparison result to comparison result selector 36. Second comparator 35 is a comparator provided corresponding to service B.

This second comparator 35 is connected with resource measurement device 32 and comparison result selector 36; it compares the measured value of the resource use condition and a call admission threshold value for service B (second threshold value) and outputs this comparison result to comparison result selector 36.

Comparison result selector 36 is connected with call admission control device 31, service identifier 33, first comparator 34 and second comparator 35; it selects one or other of the comparison results from first comparator 34 or second comparator 35, in accordance with service information that is input from service identifier 33 and outputs this to call admission control device 31. Call admission control device 31 performs call admission restriction processing in which it restricts call admission by deciding to allow or reject acceptance of new calls in accordance with the comparison result of which is input thereto.

This call admission control device 31 thus constitutes call admission restriction means that restricts acceptance of new calls in accordance with the comparison result of the measured value of the resource use condition and the call admission threshold value. Also, the two comparators, namely, first comparator 34 and second comparator 35 as well as comparison result selector 36 constitute comparison result acquisition means that acquires the comparison result and that is used for restricting acceptance of new calls.

Figure 3:
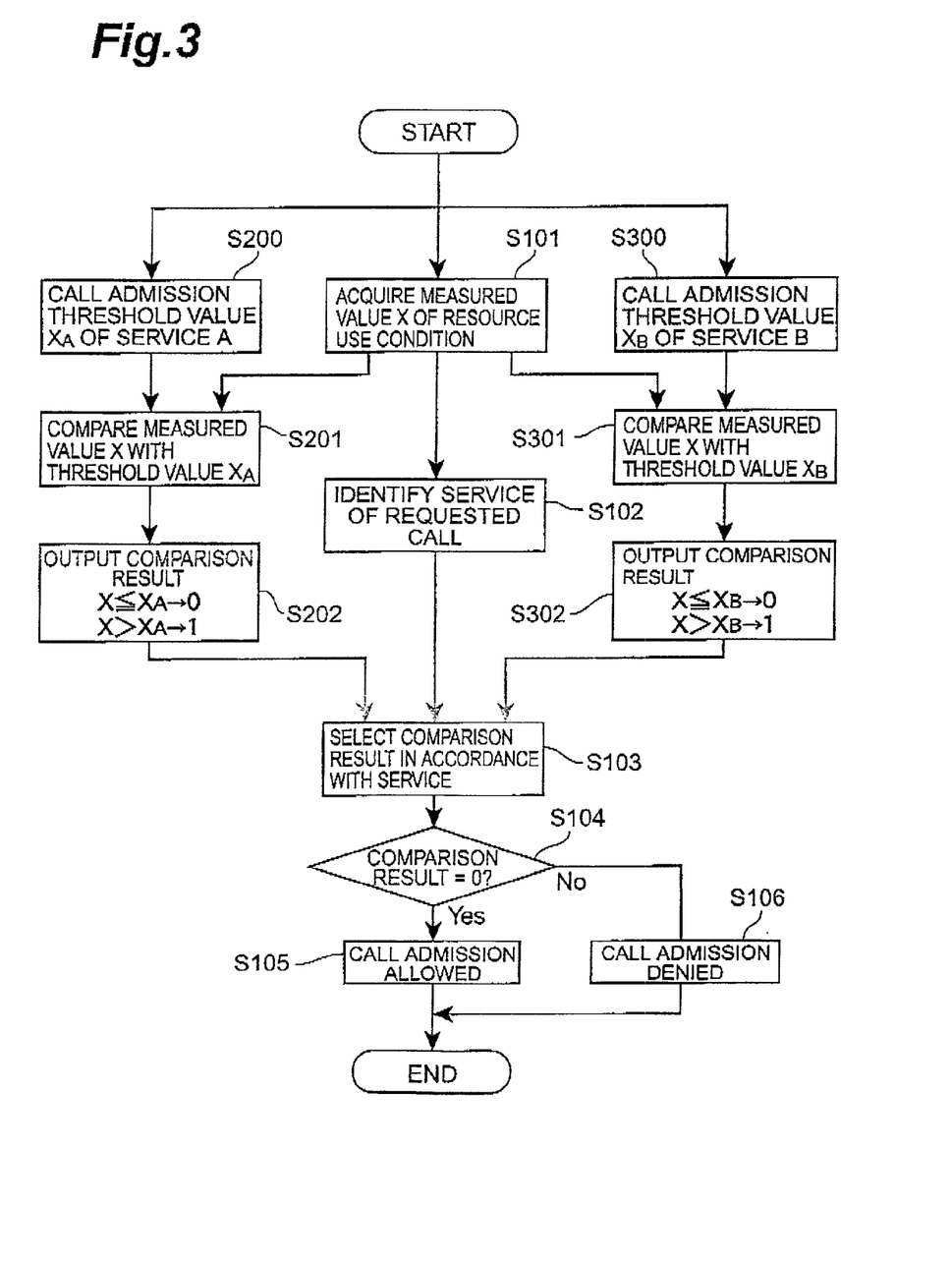
FIG. 3 is a flowchart showing an example of a call admission control method in a mobile communication system employing the base station device shown in FIG. 2.

FIG. 3 is a flowchart showing an example of a call admission control method in a mobile communication system employing the base station device 10 shown in FIG. 2. When there is a new call access request (call in accordance with service A or service B) from call processing control device 40, call admission processing including call admission restricting processing is commenced.

In this call admission restriction processing, a predetermined wireless resource is designated as the subject of monitoring. Also, different call admission threshold values are set beforehand in accordance with the degree of priority of the respective services in respect of the resource use condition of the wireless resource to be monitored.

Specifically, a call admission threshold value $x_A$ constituting a first threshold value is set (step S200) in respect of calls requested by service A, which is of a high degree of priority. Also, call admission threshold value $x_B$ constituting a second threshold value is set (step S300) in respect of calls requested by service B, which is of a low degree of priority. It should be noted that the first threshold value $x_A$ of service A is set higher than the second threshold value $x_B$ of service B, which is of lower priority ($x_B < x_A$); in this way, call admission can be suitably controlled in accordance with the degree of priority or the services. Also, the necessary data such as these call admission threshold values $x_A$ and $x_B$ is stored for example in memory 50 which is connected to call admission control section 30.

Call admission restricting processing is commenced in which a call admission threshold value is applied in respect of newly generated call requests. First of all, the resource use condition in transmitting/receiving section 20 is measured (S101, resource measurement step) by resource measurement device 32 in respect of the wireless resource that is to be monitored. The acquired measured value x is output respectively to first comparator 34 and second comparator 35.

Next, in first comparator 34, a comparison is made (S201, comparison step) of the measured value x of the resource use condition input from resource measurement device 32 and call admission threshold value $x_A$ in service A. The comparison result obtained (first comparison result) is then output (S202) to comparison result selector 36. Specifically, for example, the magnitudes of measured value x and first threshold value $x_A$ are compared. Then, if measured value x is less than or equal to first threshold value $x_A$ ($x \leq x_A$), "0" is output as the comparison result. On the other hand, if the measured value x is greater than first threshold value $x_A$ ($x > x_A$), "1" is output as the comparison result.

Also, in second comparator 35, a comparison is made (S301, comparison step) of the measured value x of the resource use condition input from resource measurement device 32 and call admission threshold value $x_B$ in service B. The comparison result obtained (second comparison result) is then output (S302) to comparison result selector 36. Specifically, for example, the magnitudes of measured value x and second threshold value $x_B$ are compared. Then, it measured value x is less than or equal to second threshold value $x_B$ ($x \leq x_B$), "0" is output as the comparison result. On the other hand, if the measured value x is greater than second threshold value $x_B$ ($x > x_B$), "1" is output as the comparison result.

Furthermore, service identifier 33 identifies the type of service or the requested call or the degree of priority of this service (S102, service identification step), using information from transmitting/receiving section 20 or call admission control device 31. The service information concerning the type of the identified service or its degree of priority is output to comparison result selector 36.

Next, comparison result selector 36 selects (S103, comparison result selection step) one or other of the first and second comparison results from first and second comparators 34, 35 in accordance with the service information that is input from service identifier 33. The selected comparison result is output to call admission control device 31. The comparison result that are used in restriction of new call admission are acquired (comparison result acquisition step) by means of the above steps S201, S202, S301, S302 and S103.

As comparison result selector 36, there is employed for example a switch having a first terminal connected to first comparator 34, a second terminal connected to second admission control device 31, and that is capable of changing over connection of the third terminal to the first terminal or second terminal.

In this case, when service information on a call request in accordance with service A is input from service identifier 33, the third terminal is connected to the first terminal so that the first comparison result from first comparator 34 is selected and output to call admission control device 31. Also, when service information on a call request in accordance with service B is input, the third terminal is connected to the second terminal so that the second comparison result from second comparator 35 is selected and output to call admission control device 31.

Call admission control device 31 performs call admission processing including call admission restriction processing in accordance with the comparison result that is input thereto from comparison result selector 36. First of all, it ascertains (S104) whether the comparison result selected by comparison result selector 36 is "0" or "1". Transmitting/receiving section 20 is then controlled (S105) to allow call admission if the comparison result output is "1" i.e. if the measured value x of the resource use condition is less than or equal to the call admission threshold value. On the other hand, if the comparison result output is "1" i.e. if the measured value x of the resource use condition is greater than the call admission threshold value, call admission is denied (S106). Restriction of new call admission is performed (call admission restriction step) in accordance with the degree of priority of each service by the above steps S104 to S106.

The effects of the mobile communication system, base station device and call admission control method illustrated in FIG. 1 to FIG. 3 will be described with reference to an example of specific communication conditions.

With the call admission control method, mobile communication system (communication system) and base station device according to the present embodiment, in communication such as mobile communication in which calls of a plurality of services, in the above example service A and service B, having mutually different priority are present together, restriction of new calls is performed by applying call admission threshold values to the resource use condition of wireless resources etc and call admission threshold values respectively set in accordance with the degree of priority of the services are employed as the call admission threshold values used for this restriction.

In this process, the method of restricting new call admission can be altered in accordance with the difference in degree of priority of the services. In this way, in communication in which access is performed with shared resources, it becomes possible to perform call admission control in a suitable manner in accordance with the service that the user is attempting to use, while also suppressing deterioration of communication quality. Specifically, the degree of priority of each service corresponds to the real-time character of communication in that service, its importance and urgency.

Also, a decision whether or not to allow new call admission is made by acquiring a measured value of resource use condition in respect of the wireless resource that is to be monitored and comparing this measured value with the magnitude of the call admission threshold value. In this way, restriction of new call admission can be efficiently implemented.

Figure 4:
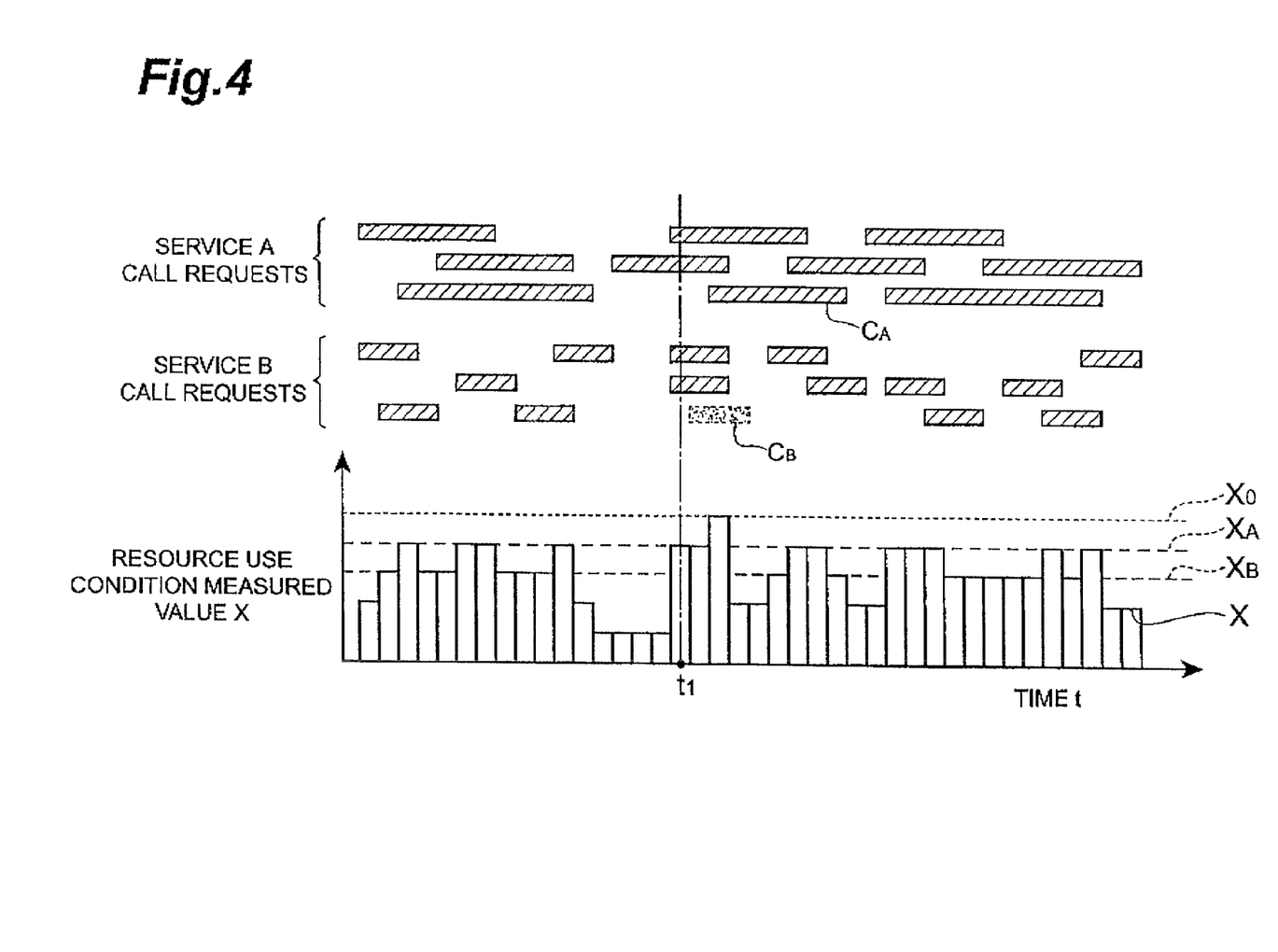
FIG. 4 is a graph showing an example of the communication condition in a mobile communication system employing the call admission control method shown in FIG. 3.

FIG. 4 shows an example of the communication condition when the call admission control method shown in FIG. 3 is applied to a communication system in which calls of a plurality of services having mutually different degrees of priority are present together, sharing the same resources.

FIG. 4 is a graph showing the change with time t of the access condition (access origination and termination) of calls requested by service A and service B and the measured value x of resource use condition, with the horizontal axis being shown as the time axis. Of service A and service B, as described above, the degree of priority of service A is higher than that of service B.

The graph illustrating the change with time of measured value x of resource use condition respectively shows the first threshold value $x_A$ in respect of service A described above with reference to the flowchart of FIG. 3, the second threshold value $x_A$ of service B and measured value x and the quality deterioration threshold value $x_Q$ at which deterioration of communication quality actually occurs. Corresponding to the degrees of priority of the services, first threshold value $x_A$ is higher than second threshold value $x_B$ ($x_B < x_A$).

In the example of communication condition shown in FIG. 4, at time point $t_1$, the measured value x of resource use condition is equal to the threshold value $x_A$ in respect of service A ($x = x_A$) and is greater than the threshold value $x_B$ in respect of service B ($x > x_B$).

In this condition, when there is a call request $C_B$ of service B, which is of low degree of priority, since measured value x exceeds the call admission threshold value $x_B$ in respect of service B, this call request is subject to the restriction on new call admission and call admission is denied. Furthermore, if subsequently there is a call request $C_A$ of service A which is of a high degree of priority, since measured value x is less than or equal to the call admission threshold value $x_A$ in respect of service A, call admission in response to this call request is allowed.

Figure 5:
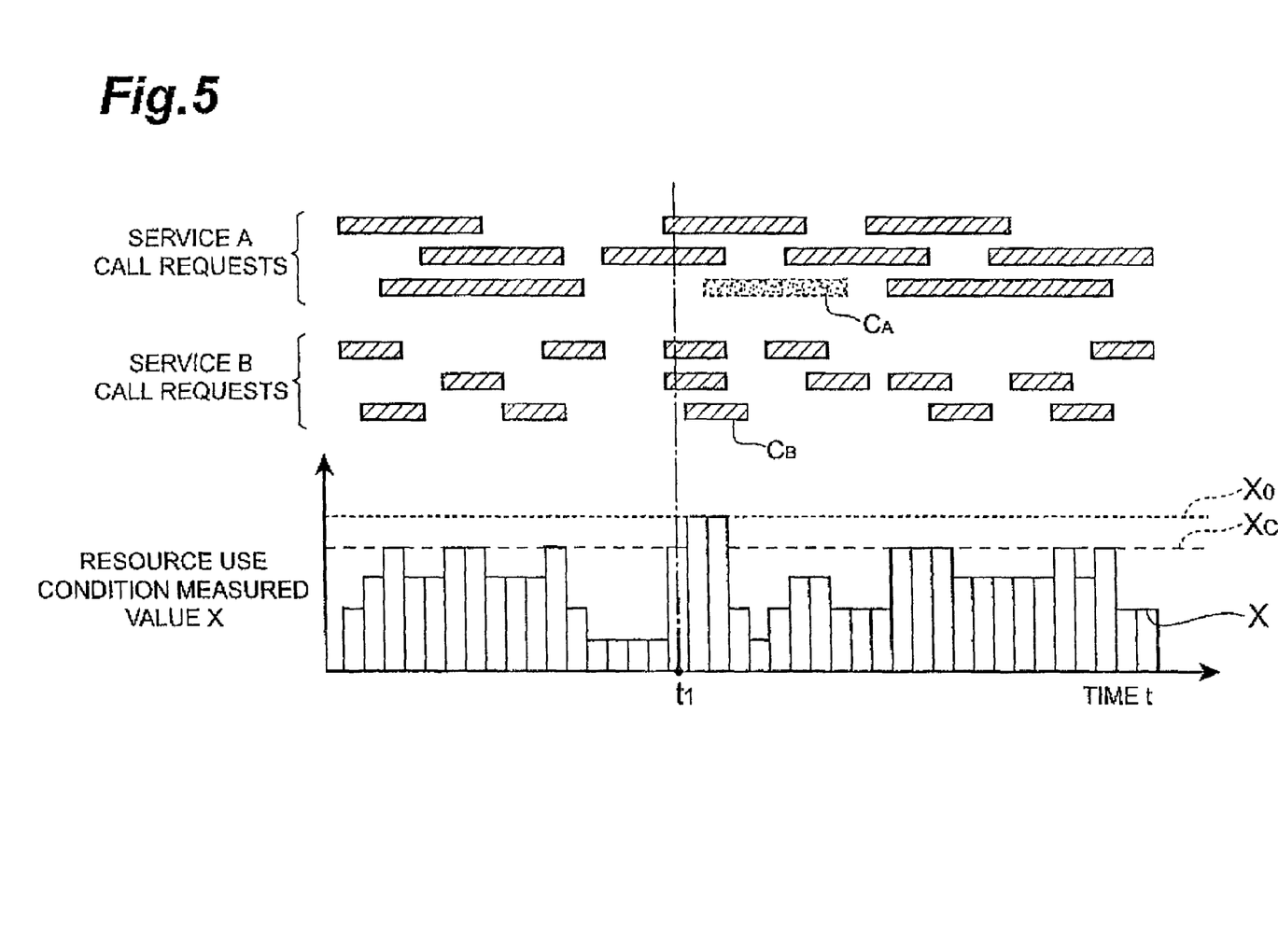
FIG. 5 is a graph showing the communication condition in a mobile communication system employing a conventional call admission control method.

In contrast, FIG. 5 shows an example in which the same call admission threshold value $x_C$ is applied in irrespective of the degree of priority of the services, in respect of the same communication condition. In this example, at time point $t_1$, the measured value x of the resource use condition is the same as the common call admission threshold value $x_C$ ($x=x_C$) in respect of service A and service B.

In this condition, when there is a call request $C_B$ of service B, which is of low degree of priority, since the measured value x is less than or equal to the common call admission threshold value $x_C$, call admission in respect of this call request is allowed. Furthermore, if subsequently there is a call request $C_A$ of service A which is of high degree of priority, since measured value x exceeds the call admission threshold value $x_C$ because call admission has already been allowed in respect of call request $C_B$, this call request is subjected to the restriction on new call admission and call admission is denied.

That is, in the example of the communication condition shown in FIG. 5 in which a communication call admission threshold value is set in respect of the services, restriction on call request $C_A$ of service A is imposed due to the acceptance of call request $C_B$, of service B, so calls of service A, which is of high degree of priority, are squeezed out by calls of service B, which is of low degree of priority.

In contrast, in the example of the communication condition shown in FIG. 4, thanks to the employment of a call admission control method as described above in which the call admission threshold value is set in accordance with the degree of priority of the service, call requests of service A, which is of high degree of priority, are preferentially accepted in comparison with call requests of service B. The services that are sought to be utilized by users of the communication system are therefore protected in appropriate manner in accordance with their respective degrees of priority.

Various types of resources may be utilized as the resources that are shared by multiple access by the various users and whose resource use condition is monitored. As such resources, for example in the FDMA system or TDMA system, preferably at least either the number of channels or the number of wireless devices is taken. Also, in the CDMA system, preferably at least one of the amount of up-link interference, down-link transmission power, number of the devices employed, or number of spreading codes is taken.

Also, regarding the respective degree of priority of the plurality of services, preferably a service using circuit switching system as the switching system is taken as the first service, of high degree of priority (service A in the above example) and a service using a packet switching system is taken as the second service, of low degree of priority (service B in the above example).

The circuit switching system is a system in which communication by users connected by a circuit switching call results in occupation of fixed resources irrespective of the presence or absence of transmitted data and is therefore utilized for services of a high degree of real-time character (degree of priority). In contrast, in a packet switching system, in communication of users connected by a packet call, the data that are transmitted are data in small units called packets; thus resources are occupied in accordance with need and data are transmitted in packet units; this system is employed for services in which the degree of requirement for real-time character (priority) is low.

In regard to these two switching systems, by setting the call admission threshold value at a high level in the case of the circuit switching system and setting the call admission threshold value at a low level in the case of the packet switching system, control of call admission in accordance with the degree of priority of each service can be performed in an easy and convenient fashion.

Also, even in regard to calls likewise utilizing the circuit switching system, there are differences regarding the importance and urgency between ordinary telephone calls and emergency calls, so their degrees of priority are different. The call admission control method described above can be applied in such cases also.

Figure 6:
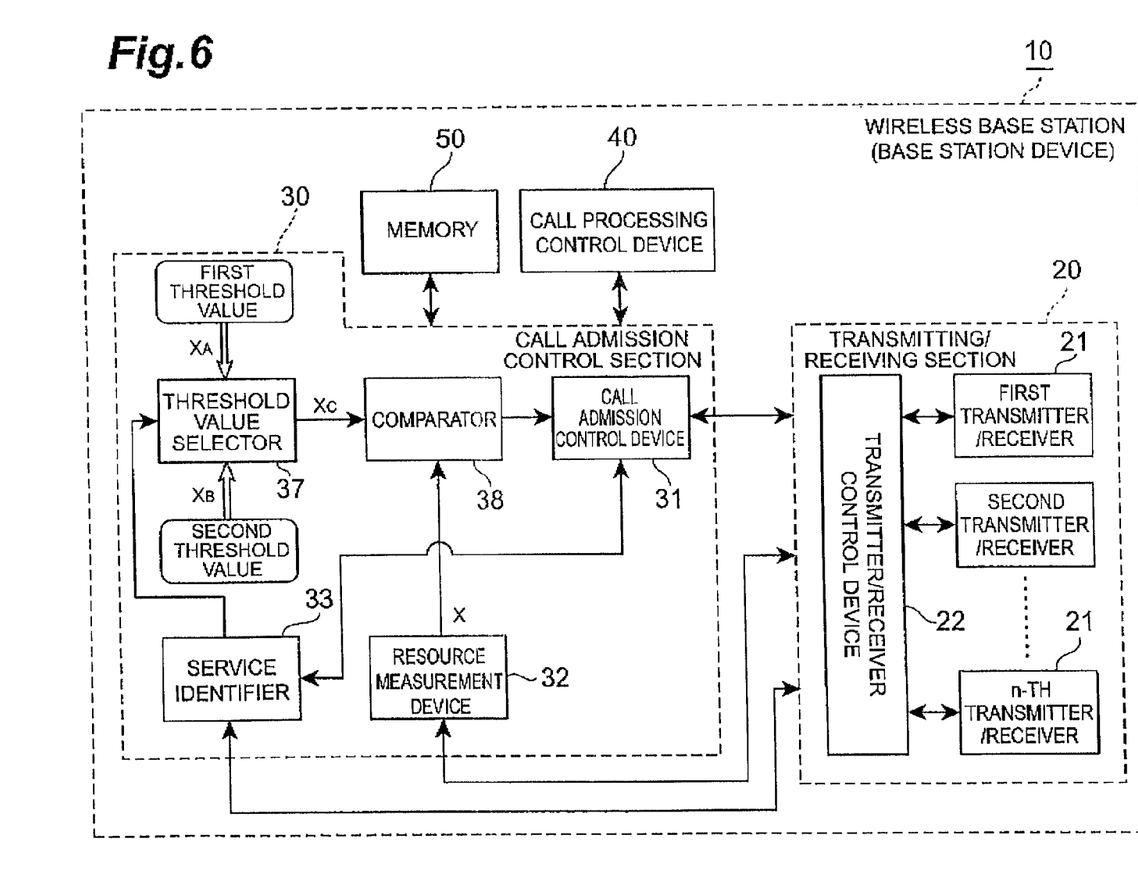
FIG. 6 is a block diagram illustrating the structure of another embodiment of a base station device.

FIG. 6 is a block diagram illustrating the structure of another embodiment of a base station device according to the present invention used as a wireless base station in the mobile communication system shown in FIG. 1. In this embodiment, as in the case of the embodiment illustrated in FIG. 2, two types of service, namely, service A constituting a first service of high degree of priority and service B constituting a second service of lower degree of priority than service A are provided as the plurality of services of mutually different degree of priority.

This base station device 10 comprises a transmitting/receiving section (transmitter/receiver) 20 and a call admission control section 30. A call processing control device 40 and memory 50 are connected with call admission control section 30. The structure etc of transmitting/receiving section 20, call processing control device 40 and memory 50 are the same as in the case of the base station device of the embodiment shown in FIG. 2.

Call admission control section 30 comprises a call admission control device 31, resource measurement device (resource measurement means) 32, service identifier (service identification means) 33, threshold value selector (threshold value selection means) 37 and comparator (comparison means) 38. Call admission control device 31 is connected with transmitting/receiving section 20 and comparator 38; it controls the call admission operation and the data transmitting/receiving operation of transmitting/receiving section 20 in accordance with requests from call processing control device 40, and also performs reading, updating and writing etc of the necessary data in respect of memory 50.

Resource measurement device 32 is connected with transmitting/receiving section 20 and comparator 38; it measures the resource use condition of the wireless resource at the transmitting/receiving section 20 that is to be monitored and outputs a measured value to comparator 38. Service identifier 33 is connected with transmitting/receiving section 20, call admission control device 31 and threshold value selector 37; it identifies the type of service of the requested call and the degree of priority of this service using information from transmitting/receiving section 20 or call admission control device 31 and outputs service information to threshold value selector 37.

A threshold value selector 37 is connected with service identifier 33 and comparator 38; it selects one or other of a call admission threshold value (first threshold value) corresponding to service A and a call admission threshold value (second threshold value) corresponding to service B on the basis of service information input thereto from service identifier 33, and outputs this to comparator 38.

Comparator 38 is connected with call admission control device 31, resource measurement device 32 and threshold value selector 37; it compares the measured value of the resource use condition and the call admission threshold value selected by threshold value selector 37 and outputs the result of this comparison to call admission control device 31. Call admission control device 31 then performs call admission restriction processing that restricts call admission by making a decision to allow or reject new call admission in accordance with the comparison result that is input thereto.

This call admission control device 31 constitutes call admission restriction means that restricts acceptance of new calls in accordance with the comparison result of the measured value of the resource use condition and the call admission threshold value. Also, threshold value selector 37 and comparator 38 constitute comparison result acquisition means that acquires the comparison result used for restriction of acceptance of new calls.

Figure 7:
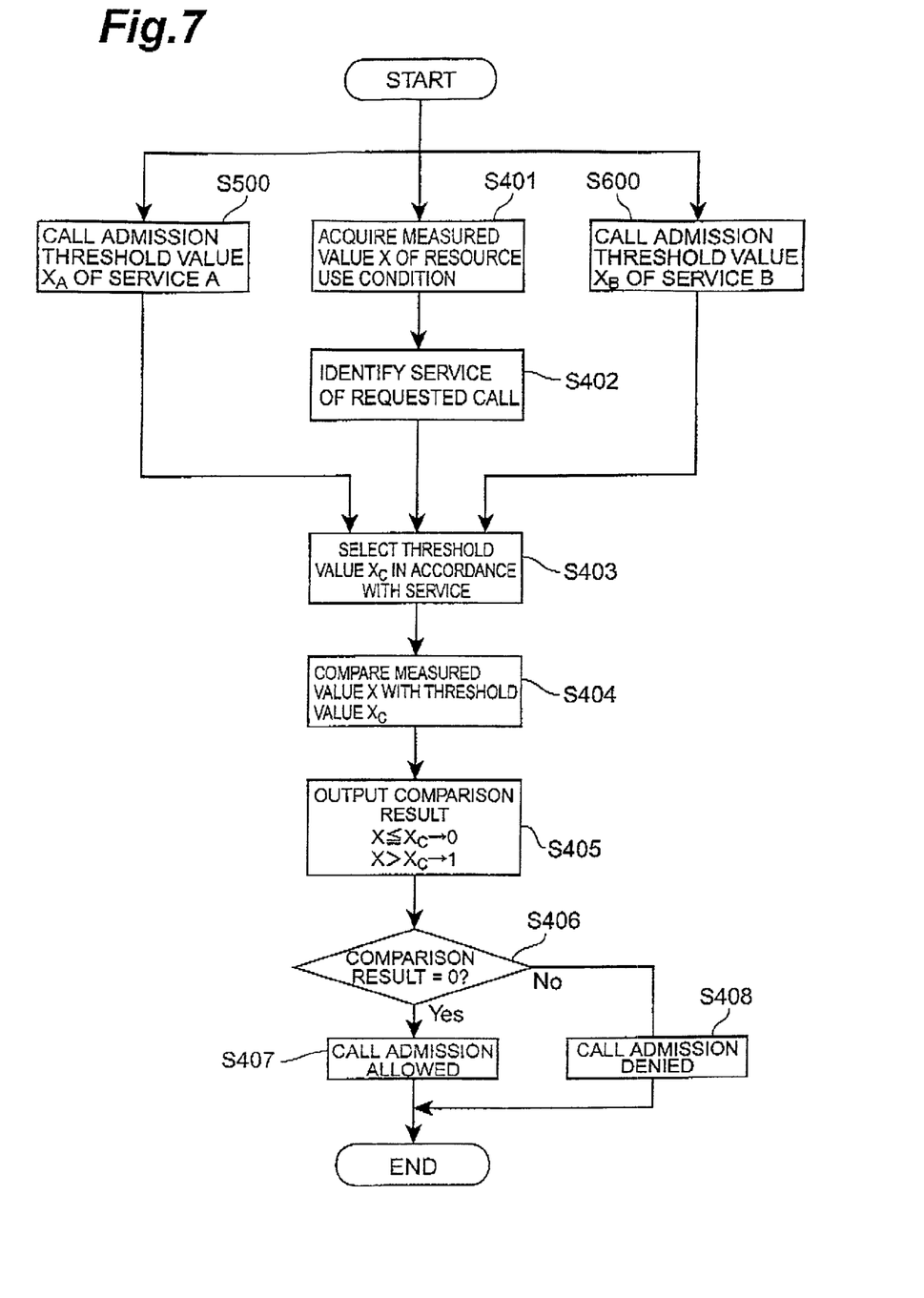
FIG. 7 is a flowchart showing an example of a call admission control method in a mobile communication system employing the base station device shown in FIG. 6.

FIG. 7 is a flowchart illustrating an example of a call admission control method in a mobile communication system using base station device 10 shown in FIG. 6. When there is a connection request for a new call (call of service A or service B) from call processing control device 40, call admission processing, including call admission restriction processing, is commenced.

In call admission restriction processing, a predetermined wireless resource is designated as the subject of monitoring. Also, different call admission threshold values are set beforehand in respect of the resource use condition of the wireless resource to be monitored, depending on the degree of priority of the respective service.

Specifically, call admission threshold value $x_A$ constituting a first threshold value is set (step S500) in respect of calls requested by service A, which is of high degree of priority. Also, call admission threshold value $x_B$, constituting a second threshold value, is set (step S600) in respect of calls requested by service B, which is of low degree of priority. It should be noted that the first threshold value $x_A$ of service A is set to higher than the second threshold value $x_B$ of service B, which is of lower degree of priority ($x_B < x_A$); in this way, call admission is appropriately controlled in accordance with the degree of priority of each service. Also, the necessary data such as these call admission threshold values $x_A$, $x_B$ is stored for example in memory 50, which is connected with call admission control section 30.

Call admission restriction processing is commenced that is performed by applying the call admission threshold value in respect of newly generated call requests. First of all, the resource use condition in transmitting/receiving section 20 is measured (S401, resource measurement step) by means of resource measurement device 32 in respect of the wireless resource to be monitored. The acquired measured value x is output to comparator 38.

Also, service identifier 33 identifies (S402, service identification step) the type of service or the degree of priority of this service of the requested call, using information from transmitting/receiving section 20 or call admission control device 31. The service information in respect of type or degree of priority of the identified service is output to threshold value selector 37.

Next, threshold selector 37 selects as the call admission threshold value $x_C$ (S403, threshold value selection step) one or other of the call admission threshold value $x_A$ corresponding to service A and the call admission threshold value $x_B$ corresponding to service B, in accordance with the service information that is input from service identifier 33. The selected call admission threshold value $x_C$ is output to comparator 38.

Next, comparator 38 performs a comparison of the measured value x of the resource use condition that is input from resource measurement device 32 and the call admission threshold value $x_C$ that was selected (S404, comparison step). The comparison result obtained is then output to call admission control device 31 (S405). Specifically, for example the magnitudes of measured value x and threshold value $x_C$ are compared. Then, if the measured value x is less than or equal to the threshold value $x_C$ ($x \leq x_C$), the comparison result "0" is output. On the other hand, if the measured value x is larger than the threshold value $x_C$ ($x > x_C$), the comparison result "1" is output. The comparison results used in restriction of new call admission are acquired in the steps S403 to S405 above (comparison result acquisition steps).

Call admission control device 31 performs call admission processing, including call admission restriction processing, using the comparison result that is input from comparator 38. First of all, it is determined (S406) whether the comparison result from comparator 38 is "0" or "1". Then, if the comparison result output is "0" i.e. if the measured value x of the resource use condition is less than or equal to the call admission threshold value, the transmitting/receiving section 20 is controlled (S407) so as to allow call admission. On the other hand, if the comparison result output is "1" i.e. if the measured value x of the resource use condition is larger than the call admission threshold value, call admission is denied (S408) By the above steps S406 to S408, restriction of new call admission is performed (call admission restriction step) in accordance with the degree of priority of each service.

By means of the call admission control method, mobile communication system (communication system) and base station device according to the embodiment of FIG. 6 and FIG. 7, the method of restriction of new call admission can be altered in accordance with the difference of the degree of priority of each service, in the same way as in the case of the embodiment shown in FIG. 2 and FIG. 3. In this way, in communication in which access is performed using shared resources, call admission can be suitably controlled in accordance with the service sought to be used by the user, while suppressing deterioration of communication quality.

It should be noted that, regarding a mobile communication system, in Japanese Patent Application Laid-open No. H10-13937, it is stated that a plurality of threshold values are set for each service. In this call admission control method, a plurality of threshold values corresponding to the type of service are set and, on call admission, a threshold value is selected in accordance with the type of service from the mobile station and call admission is controlled by comparing the selected threshold value and the number of users, the amount of interference etc. However, with this method, what sort of threshold value should be set in order to make possible appropriate call admission control is not made clear.

In contrast, with the call admission control method, communication system and base station device of the present invention, it is arranged to set a plurality of corresponding call admission threshold values in accordance with the respective degree of priority of a plurality of services. In this way, it is made possible to control call admission in such a manner that the respective services are suitably protected in accordance with the content of the service that is sought to be utilized by a plurality of users.

The call admission control method, communication system and base station device according to the present invention are not restricted to the embodiments described above but can be modified in various ways. For example, in the base station device 10 shown in FIG. 2 and FIG. 6 and the flowchart of the call admission control method shown in FIG. 3 and FIG. 7, the services provided in the mobile communication system are assumed to be of two types, namely, service A and service B. On the other hand, even when three or more types of service are provided, it is possible to perform the same call admission control processing by expanding the device construction or processing procedure.

Also, in the method of resource measurement in resource measurement device 32, a suitable method of measurement may be employed in accordance with the resource that is set as the subject of monitoring. Also, regarding the communication system, although, in the embodiments described above, by way of example, a mobile communication system was described in which multiple access is performed with shared wireless resources, the call admission control method described above is not restricted to mobile communication systems and could be applied to other modes of communication system in which resources are shared.

It should be noted that, regarding the two steps of measurement of the resource use condition and service identification shown in the flowchart of FIG. 3 and FIG. 7, either of these could be performed first or parallel processing could be adopted in which they are performed concurrently. Also, regarding the setting beforehand of the plurality of call admission threshold values corresponding to the plurality of services, these may be set beforehand prior to execution of call admission. Consequently, for example, in a base station device, the call admission threshold values may be altered by instructions etc from an upper-layer station.

As described in detail above, with the call admission control method, communication system and base station device according to the present invention, the following effects are obtained. Specifically, in communication in which calls of a plurality of services having mutually different degrees of priority are present, deterioration in communication quality can be suitably suppressed by control of call admission in accordance with the service that is utilized by the user in the communication system, by employing a call admission control method, communication system and base station device whereby new call admission is restricted by applying a call admission threshold value in respect of the resource use condition, using call admission threshold values set in accordance with the degree of priority of the services.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A call admission control method in a communications system configured to support calls of a plurality of services having mutually different degrees of priority, comprising:
    receiving a call having a service type;
    comparing a measured resource use condition with a first and a second admission threshold value so as to obtain a first and a second comparison result;
    selecting one of the first and second obtained comparison results on the basis of the service type of the call; and
    admitting or not admitting the call on the basis of the selected comparison result; the service type is one of a priority and a non-priority service type; the first and second admission thresholds correspond to one of the priority and non-priority service type, respectively; the first admission threshold is higher than the second admission threshold; the priority service type corresponds to a circuit switching service; and the non-priority service type corresponds to a packet switching service.

2. The call admission control method of claim 1, wherein the communications system comprises one of a FDMA system and a TDMA system, and
    the method further comprises monitoring at least one of a number of channels and a number of wireless devices active within the communications system.

3. The call admission control method of claim 1, wherein the communications system comprises a CDMA system, and
    the method further comprises monitoring at least one of an amount of up-link interference, a down-link transmission power, a number of calling devices and a number of spreading codes.

4. A call admission control method in a communications system configured to support calls of a plurality of services having mutually different degrees of priority, comprising:
    receiving a call having a service type;
    selecting an admission threshold value from a set of at least two threshold values on the basis of the service type of the call;
    comparing a measured resource use condition with the selected admission threshold value so as to obtain a comparison result; and
    admitting or not admitting the call on the basis of the obtained comparison result; the service type is one of a priority and a non-priority service type; the first and second admission thresholds correspond to one of the priority and non-priority service type, respectively; the first admission threshold is higher than the second admission threshold; the priority service type corresponds to a circuit switching service; and the non-priority service type corresponds to a packet switching service.

5. The call admission control method of claim 4, wherein the communications system comprises one of a FDMA system and a TDMA system, and
    the method further comprises monitoring at least one of a number of channels and a number of wireless devices active within the communications system.

6. The call admission control method of claim 4, wherein the communications system comprises a CDMA system, and
    the method further comprises monitoring at least one of an amount of up-link interference, a down-link transmission power, a number of calling devices and a number of spreading codes.

7. A call admission control device within a communications system configured to support calls of a plurality of services having mutually different degrees of priority, comprising:
    a transmit/receive device configured to receive a call having a service type;
    a service identification device connected to the transmit/receive device and configured to identify the service type;
    a resource measurement device connected to the transmit/receive device and configured to measure a resource use condition;
    first and second comparators connected in parallel to the resource measurement device, the first and second comparators configured to compare the measured resource use condition with a first and second threshold, respectively, and to output a respective first and second comparison result;

a comparison result selector connected to each of the service identification device, the first comparator, and the second comparator, the comparison result selector configured to select one of the first and second comparison result on the basis of the service type; and a call admission control device connecting the comparison result selector to the transmit/receive device and configured to admit or not admit the call on the basis of the selected comparison result; the service type is one of a priority and a non-priority service type; the first and second admission thresholds correspond to one of the priority and non-priority service type, respectively; the first admission threshold is higher than the second admission threshold; the priority service type corresponds to a circuit switching service; and the non-priority service type corresponds to a packet switching service.

8. The call admission control device of claim 7, wherein the communications system comprises one of a FDMA system and a TDMA system, and the device further comprises a monitor configured to monitor at least one of a number of channels and a number of wireless devices active within the communications system.

9. The call admission control device of claim 7, wherein the communications system comprises a CDMA system, and the call admission control device further comprises a monitor configured to monitor at least one of an amount of up-link interference, a down-link transmission power, a number of wireless devices active within the communications system, and a number of spreading codes.

10. A call admission control device within a communications system configured to support calls of a plurality of services having mutually different degrees of priority, comprising:

a transmit/receive device configured to receive a call having a service type;

a service identification device connected to the transmit/receive device and configured to identify the service type;

a resource measurement device connected to the transmit/receive device and configured to measure a resource use condition;

a threshold value selector connected to the service identification device and configured to select a threshold value from a set of at least two thresholds based on the service type;

a comparator connected to the resource measurement device and the threshold value selector, the comparator configured to compare the measured resource use condition with a selected threshold, respectively, and to output a comparison result; and a call admission control device connecting the comparator to the transmit/receive device and configured to admit or not admit the call on the basis of the comparison result; the service type is one of a priority and a non-priority service type; the first and second admission thresholds correspond to one of the priority and non-priority service type, respectively; the first admission threshold is higher than the second admission threshold; the priority service type corresponds to a circuit switching service; and the non-priority service type corresponds to a packet switching service.

11. The call admission control device of claim 10, wherein the communications system comprises one of a FDMA system and a TDMA system, and the device further comprises a monitor configured to monitor at least one of a number of channels and a number of wireless devices active within the communications system.

12. The call admission control device of claim 10, wherein the communications system comprises a CDMA system, and the call admission control device further comprises a monitor configured to monitor at least one of an amount of up-link interference, a down-link transmission power, a number of wireless devices active within the communications system, and a number of spreading codes.

13. A call admission control device in a communications system configured to support calls of a plurality of services having mutually different degrees of priority, comprising:

means for receiving a call having a service type;

means for comparing a measured resource use condition with a first and a second admission threshold value so as to obtain a first and second comparison result;

means for selecting one of the first and second comparison result on the basis of the service type; and means for admitting or not admitting the call on the basis of the selected comparison result; the service type is one of a priority and a non-priority service type; the first and second admission thresholds correspond to one of the priority and non-priority service type, respectively; the first admission threshold is higher than the second admission threshold; the priority service type corresponds to a circuit switching service; and the non-priority service type corresponds to a packet switching service.

14. A call admission control device in a communications system configured to support calls of a plurality of services having mutually different degrees of priority, comprising:

means for receiving a call having a service type;

means for selecting an admission threshold value from a set of at least two threshold values on the basis of the service type;

means for comparing a measured resource use condition with the selected admission threshold value so as to obtain a comparison result; and means for admitting or not admitting the call on the basis of the comparison result; the service type is one of a priority and a non-priority service type; the first and second admission thresholds correspond to one of the priority and non-priority service type, respectively; the first admission threshold is higher than the second admission threshold; the priority service type corresponds to a circuit switching service; and the non-priority service type corresponds to a packet switching service.

15. A base station, comprising:

a call admission control device as recited in one of claims 7, 10, 13 and 14.

16. A computer program product, comprising executable instructions which, when executed, causes a computing device to execute the method as recited in one of claims 1 and 4.

* * * * *